(12) United States Patent  (10) Patent No.: US 8,087,186 B2
Rastegar et al.  (45) Date of Patent: Jan. 3, 2012

(54) PIEZOELECTRIC-BASED TOE-HEATERS FOR FROSTBITE PROTECTION

(75) Inventors: Jahangir S. Rastegar, Stony Brook, NY (US); Tromas Spinelli, East Northport, NY (US)

(73) Assignee: Omnitek Partners LLC, Ronkonkoma, NY (US)

( * ) Notice: Subject to any disclaimer, the term of this patent is extended or adjusted under 35 U.S.C. 154(b) by 949 days.

(21) Appl. No.: 12/075,645

(22) Filed: Mar. 13, 2008

(65) Prior Publication Data

US 2009/0229142 A1  Sep. 17, 2009

(51) Int. Cl.
*A43B 7/04* (2006.01)
(52) U.S. Cl. ............... 36/2.6; 36/27; 290/1 R; 290/1 E; 290/1 A; 310/75 B
(58) Field of Classification Search ............ 36/2.6, 36/3 B, 27; 290/1 R, 1 A, 1 E; 310/75 B
See application file for complete search history.

(56) References Cited

U.S. PATENT DOCUMENTS

| | | | | | |
|---|---|---|---|---|---|
| 4,536,097 | A | * | 8/1985 | Nilsson ............................ 347/71 |
| 4,736,530 | A | * | 4/1988 | Lakic et al. ....................... 36/2.6 |
| 4,756,095 | A | * | 7/1988 | Lakic ................................ 36/2.6 |
| 5,041,717 | A | * | 8/1991 | Shay et al. ...................... 219/211 |
| 5,062,222 | A | * | 11/1991 | Billet et al. ....................... 36/2.6 |
| 5,500,635 | A | * | 3/1996 | Mott .......................... 340/323 R |
| 6,281,594 | B1 | * | 8/2001 | Sarich ........................... 290/1 R |
| 7,107,706 | B1 | * | 9/2006 | Bailey et al. ...................... 36/88 |
| 7,204,041 | B1 | * | 4/2007 | Bailey et al. ...................... 36/29 |
| 7,219,449 | B1 | * | 5/2007 | Hoffberg et al. .................. 36/88 |

* cited by examiner

*Primary Examiner* — Jila Mohandesi

(57) ABSTRACT

A footwear including a body; a base structure; and one or more electrical energy generators disposed in the base structure for generating electrical energy upon application of an impact to the base structure. The footwear is used to produce electrical energy by impacting a base structure of the footwear; and vibrating a mass-spring unit in the base structure to generate an electrical energy.

12 Claims, 4 Drawing Sheets

PIEZOELECTRIC-BASED TOE-HEATERS FOR FROSTBITE PROTECTION

BACKGROUND

1. Field of the Invention

The present invention relates generally to footwear, and more particularly, to footwear having piezoelectric-based toe-heaters for frostbite protection.

2. Prior Art

During many outdoor activities in the winter time or in a cold environment, such as during mountain climbing, hiking, skiing, or performing varieties of tasks such as repairs, clean-up operations and the like, the feet inside shoes and boots can get very cold, and can lead to frostbite, particularly at the extremities, i.e., the toes. At the very least, such conditions can be very uncomfortable for the person exposed to the cold environment. A solution has been to provide certain means to warm the feet, particularly the toes. Appropriate amount of insulation has also been provided to minimize the amount of the heat that is needed to keep the entire feet more uniformly warm.

The provision of proper and highly effective insulation to keep heat inside and moisture outside the shoe and minimize heat loss is very well known in the art and is being widely practiced.

The provision of heating elements to generate heat inside the shoes has also been disclosed, for example, in the following patents.

U.S. Pat. No. 4,674,199 discloses a shoe with an internal warming mechanism which comprises an electrical resistance coil in the sole or upper coverings of the shoe, and with an electrical generation mechanism in the heel of the shoe which is driven by the up-and-down movements of the heel. The electrical generator includes an armature mounted for rotational movement in a magnetic field and mechanically connected to a vertical post which is dependent on the undersurface of the heel portion of the inner sole of the shoe. The post is connected through a vertical spiral groove to a sleeve which is coupled with an escapement to a flywheel that is unidirectionally driven by the sleeve. The flywheel is coupled through a gear train to the armature of the electrical generator.

U.S. Pat. No. 5,722,185 is directed to a heated shoe having a heel, a sole provided with a heating device and an outside face for making contact with the ground, and at least one energy-providing battery located in the heel and connected to the heating device. In this patent, the heating device comprises a heating film or cloth extending over at least a portion of the sole parallel to its outside face. The sole also includes a structure of closed cells extending between the heating film or cloth and the outside face of the sole.

U.S. Pat. No. 6,041,518 discloses a battery powered climate-controlled shoe which controls the climate surrounding a user's foot in the shoe during a wide range of weather conditions. The shoe contains a plurality of switches, one of which is an interlock for inhibiting operating of the system until a pressure sensitive switch is activated by the insertion of a foot into the shoe. The shoe also contains a fan and a metallic heating plate. The fan aids in the circulation of air within the shoe, and the heating plate provides warm air for circulation within the shoe during cold weather.

U.S. Pat. No. 6,041,518 discloses a frictional heat generator and a forced air circulation system for shoes and boots such as ski boots. The shoe has an inner sole which is formed of a pair of sole plates which are mounted for relative sliding movement in the shoe. The upper sole plate is pivotally attached at its toe end to an outer sole of the shoe. The lower sole plate of this pair is pivotally mounted with a crank arm which is located at its heel end. Twisted torsion cables are provided to bias the sole plates upwardly against the applied weight of the wearer. A compartment is formed in the shoe between the pair of sole plates and outer sole and is enclosed with a diaphragm to function as a bellows-type air pump to circulate air through the shoe.

The inclusion of electrical energy generators in the heels that rely on the pressure exerted by the body during walking and the like makes the user spend a lot of energy during normal walking since the heel has to deform, bringing the body downward, i.e., the entire body weight has to move down a certain distance to provide mechanical energy equal to the weight of the person times the distance that the body has displaced down. This is equivalent to the person moving up steps of equal amount or walking on sand and would be very tiring to the user. Such electrical energy generation devices are also very inefficient, thereby providing a very small portion of the energy spent by the wearer to useful electrical energy for heating the feet, thereby making them impractical. In addition, such devices developed to date do not provide enough energy to warm the feet and toes enough to avoid frostbite and other maladies, particularly in very cold environments.

The second option in the prior art uses batteries to power heating elements. Batteries of various types, however, provide a very limited amount of electrical energy. Batteries, particularly rechargeable batteries, are adequate for applications in which the user is in the cold environment a relatively short periods of times. However, for applications such as hiking, mountain climbing or even for those working outdoors for several hours at a time, batteries do not provide and adequate amount of electrical energy.

A need therefore exists for methods and devices to provide the means to warm feet inside boots worn in very cold areas subjecting the feet, particularly the toes, to frostbite and other related complications or merely to provide a more comfortable situation for those exposed to cold environments for prolonged periods. Such devices should be capable of providing significant amounts of heat to the interior of shoes that are required to keep the feet, particularly the toes, warm enough to avoid various maladies or uncomfortableness. Such devices can be used in almost any footwear, for example, construction boots, hiking boots, climbing boots, arctic shoes, ski boots, and the like.

SUMMARY

Accordingly, a footwear is provided and comprises: a body; a base structure; and one or more electrical energy generators disposed in the base structure for generating electrical energy upon application of an impact to the base structure.

The one or more electrical energy generators can be configured to generate electrical energy when the impact is applied in a direction parallel to a long axis of the base structure.

The base structure can include a cavity corresponding to each of the one or more electrical energy generators and each cavity holds a corresponding electrical energy generator therein.

At least one of the one or more electrical energy generators can comprise: a mass-spring unit having at least one spring and at least one mass capable of vibrating along a first axis; and one or more piezoelectric materials connected to the at least one spring unit such that at least one spring applies a force to the one or more piezoelectric materials to produce the electrical energy. The at least one mass can be a rigid mass connected at one end to the at least one spring. In which case, the at least one spring can comprise two springs and the one or more piezoelectric materials comprises two piezoelectric materials, wherein the mass is connected to one end of each of the two springs and the other end of the two springs is connected to a respective piezoelectric material. The at least one mass can also be a portion of the spring which is more densely wound than another portion of the spring.

At least one of the one or more electrical energy generators can comprise: a coil; a mass freely movable within the coil; and one or more springs connected to the mass such that the mass vibrates within the coil upon application of the impact.

At least one of the one or more electrical energy generators can comprise: a beam connected to the base structure at one end and having a mass positioned thereon; and one or more piezoelectric materials positioned on the beam such that the one or more piezoelectric materials are strained upon application of the impact and a resulting deflection of the beam.

The footwear can further comprise a heating element positioned within the body and electrically connected to the one or more electrical energy generators for converting the electrical energy to heat.

Also provided is a footwear comprising: a base structure; and one or more electrical energy generators disposed in the base structure, the one or more electrical energy generators having a mass-spring unit which vibrates to generate electrical energy upon application of an impact to the base structure.

The one or more electrical energy generators can be configured to generate electrical energy when the impact is applied in a direction parallel to a long axis of the base structure.

The base structure can include a cavity corresponding to each of the one or more electrical energy generators and each cavity holds a corresponding electrical energy generator therein.

At least one of the one or more electrical energy generators can comprise: the mass-spring unit having at least one spring and at least one mass capable of vibrating along a first axis; and one or more piezoelectric materials connected to the at least one spring unit such that at least one spring applies a force to the one or more piezoelectric materials to produce the electrical energy. The at least one mass can be a rigid mass connected at one end to the at least one spring. In which case, the at least one string can comprise two springs and the one or more piezoelectric materials comprises two piezoelectric materials, wherein the mass is connected to one end of each of the two springs and the other end of the two springs is connected to a respective piezoelectric material. The at least one mass can be a portion of the spring which is more densely wound than another portion of the spring.

At least one of the one or more electrical energy generators can comprise: a coil; wherein the mass spring unit comprises a mass freely movable within the coil and one or more springs connected to the mass such that the mass vibrates within the coil upon application of the impact.

The mass spring unit can comprise: a beam connected to the base structure at one end and having a mass positioned thereon; and the one or more electrical energy generators comprises one or more piezoelectric materials positioned on the beam such that the one or more piezoelectric materials are strained upon application of the impact and a resulting deflection of the beam.

The footwear can further comprise a heating element positioned within a body and electrically connected to the one or more electrical energy generators for converting the electrical energy to heat.

Also provided is a method for producing electrical energy within a footwear. The method comprising: impacting a base structure of the footwear; and vibrating a mass-spring unit in the base structure to generate an electrical energy.

The method can further comprise converting the electrical energy to heat energy. In which case, the method can further comprise applying the heat energy to at least a portion of a foot of a wearer of the footwear.

BRIEF DESCRIPTION OF THE DRAWINGS

These and other features, aspects, and advantages of the apparatus and methods of the present invention will become better understood with regard to the following description, appended claims, and accompanying drawings where:

DETAILED DESCRIPTION

Although this invention is applicable to numerous and various types of footwear, it has been found particularly useful in the environment of boots. Therefore, without limiting the applicability of the invention to boots, the invention will be described in such environment. Those skilled in the art will appreciate that the invention can be used on other types of footwear, such as shoes, sneakers and different types of boots, such as hiking and ski boots.

Furthermore, although this invention is applicable to numerous and various uses for the electrical energy produced by the footwear, it has been found particularly useful in the environment of converting the electrical energy to heat energy to warm the toes inside the footwear. Therefore, without limiting the applicability of the invention to converting the electrical energy to heat energy to warm the toes inside the footwear, the invention will be described in such environment. Those skilled in the art will appreciate that the invention can be used to convert the produced electrical energy to other types of energy or for other purposes, such as energy storage for powering portable electrical devices, heating other parts of the body or for cooling the foot or other parts of the body.

The disclosed footwear are based on the use of mass (inertial) elements, positioned in a compartment in the footwear. When the wearer kicks a relatively hard surface such as a rock or tree or a frozen surface, the said mass (inertial) elements are accelerated to certain velocities, thereby providing them with certain amount of kinetic energy. By coupling the mass (inertial) elements with appropriate elastic elements (referred to generally herein as springs), the resulting mass-elastic element system begins to vibrate after the aforementioned impact (i.e., the footwear impacting the hard surface). The mechanical energy stored in such a vibrating system can then be converted to electrical energy using any one of the well known methods and devices known in the art.

In one embodiment, piezoelectric elements are used as the means to convert the aforementioned mechanical energy to electrical energy since such elements are relatively lightweight and small. The piezoelectric elements can also produce relatively high voltages. The generated electrical energy can then be used to generate heat inside the footwear using a heating device, preferably positioned around the toe area of the footwear. Heating devices (pads) that generate heat from electrical energy are well known in the art. It is noted that some electrical energy can also be generated as the wearer walks due to unavoidable acceleration and deceleration of the footwear even during normal walking.

Figure 1:
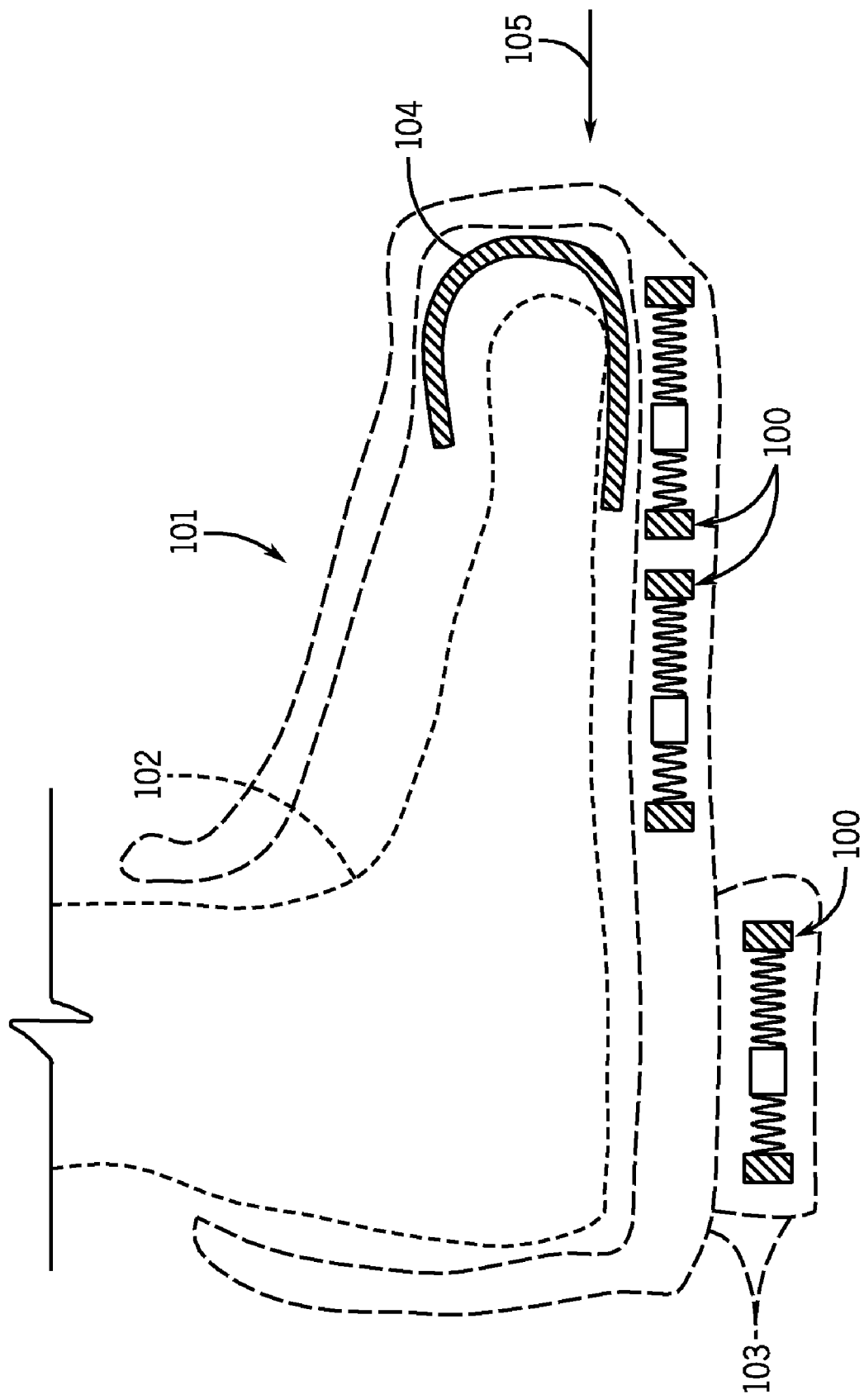
FIG. 1 illustrates a first embodiment of a footwear having generators for producing energy to heat a portion of a wearer's foot.

The schematic of one embodiment is shown schematically in FIG. 1. In FIG. 1, at least one impact-based electrical energy generator 100 is embedded in the base structure (sole/heel) 103 of the footwear 101, in this case a boot, with the wearer foot 102 shown inside the boot 101. As a result of the wearer kicking a hard surface, an impact force is imparted on the front part of the footwear in the direction of the arrow 105 (parallel to a long axis A of the base structure). As a result, the generators 100, described below in more detail, begin to generate electrical energy. The electrical energy is preferably provided directly through embedded wiring (not shown) to the heating pad(s) 104. The heating pad(s) 104 would then provide heat to the foot, preferably at least to the areas occupied by the toes. In the schematic of FIG. 1, heating pads are shown only around the toes since they are usually injured first as a result of frostbite and need most protection. However, heating pads may also be provided around other areas of the foot.

Figure 2:
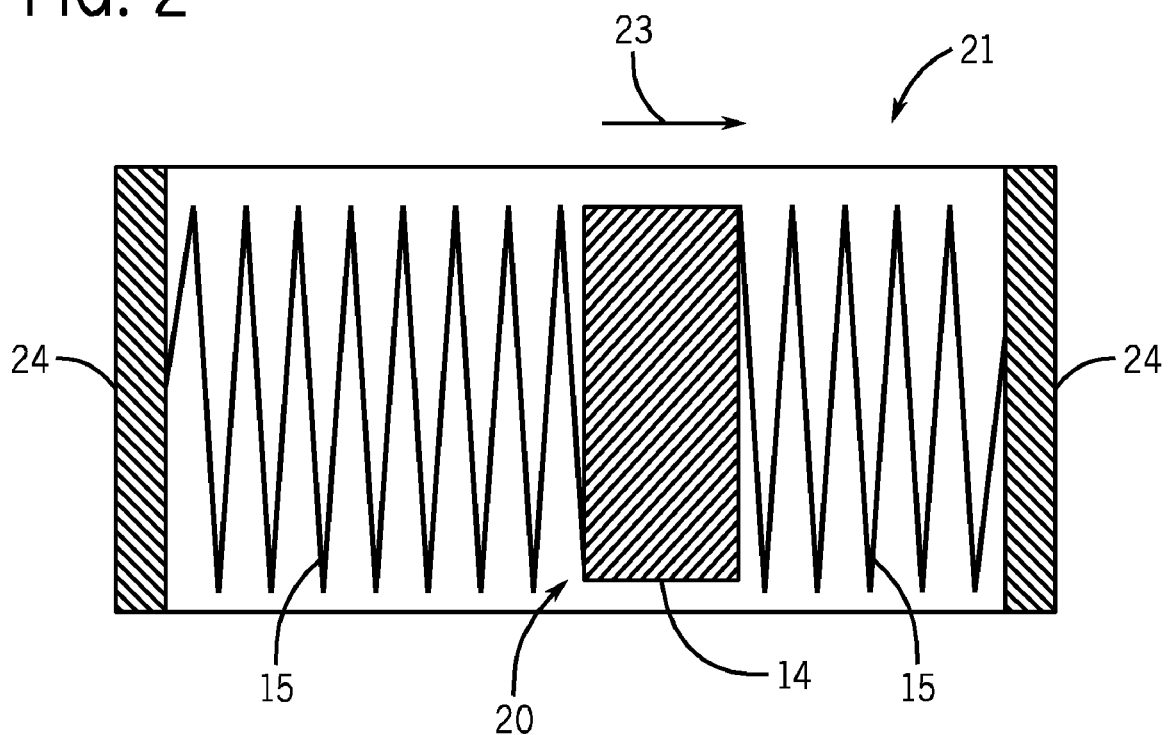
FIG. 2 illustrates an embodiment of a piezoelectric generator for use in the footwear of FIG. 1.

In one embodiment, the impact-based electrical energy generator 100 is constructed as shown schematically in FIG. 2. In this generator, the impact force or vibration motion to mechanical energy storage mechanism consists of at least one mass-spring unit 20, with at least one relatively rigid mass 14 and at least one spring element 15. The housing 21 may be an integral part of the shoe base 103, FIG. 1, or may consist of a separately formed housing component. When the user kicks a hard surface with the footwear 101, FIG. 1, the mass 14 is accelerated in the direction of arrow 23 during the duration of the impact, gaining an initial velocity $V_0$ and would have traveled a certain distance $D_0$. If the effective mass 14 of the mass-spring unit 20 is m and the effective spring rate of the mass-spring unit 20 is K, then the total mechanical energy stored in the mass-spring unit 20 as a result of the aforementioned impact (impulse) force is $$E_m = 0.5 m V_0^2 + 0.5 k D_0^2 \quad (1)$$

Following each impact, the mass-spring unit 20 will begin to vibrate. The spring element(s) 15 will then exert a varying force on the piezoelectric elements 24 (preferably made in stacked form, which is well known in the art and widely available commercially, for low voltage operation) positioned on at least one end of the spring elements 15. As a result, the piezoelectric elements 24 begin to generate a varying charge with certain voltage that is then routed to the heating pad(s) 104, FIG. 1, to generate heat.

Figure 3:
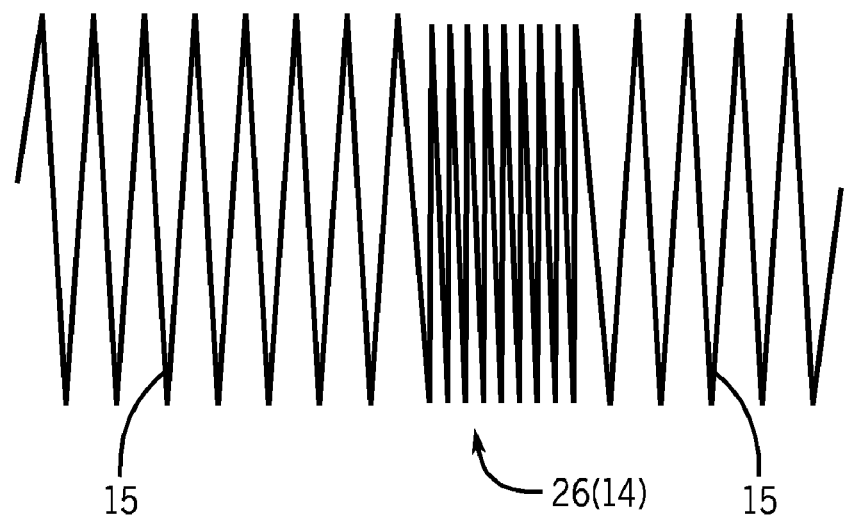
FIG. 3 illustrates a variation of the spring/mass unit of the generator of FIG. 2.

In one embodiment, the rigid mass 14 is an integral part of the spring element(s) 15. In the embodiment shown in FIG. 3, the entire mass-spring unit 20 is constructed with a single spring wire helically wound with at least one compressed coil section 26, which constitutes the relatively rigid mass of the of the mass-spring unit 20.

It is appreciated by those skilled in the art that coil and magnet type of mechanical to electrical energy generators may also be used instead of the aforementioned piezoelectric elements with the above method of storing mechanical energy due to impact (impulsive) forces for relatively slow transformation into electrical energy. All elements of this embodiment may be identical to that of the embodiment shown in FIG. 2 with the difference that the piezoelectric elements 24 are replaced with a coil 27 and magnet 28 elements. The magnet 28 is preferably the mass 14 of the mass-spring unit 20 (and not the coil 27), to eliminate the need to attach wires to the vibrating mass 14. Following each impact, the magnet 28 vibrates inside the coil, therefore causing it to generate an AC current, which is then directed to the heating pad(s) 104, FIG. 1, as previously described.

Figure 4:
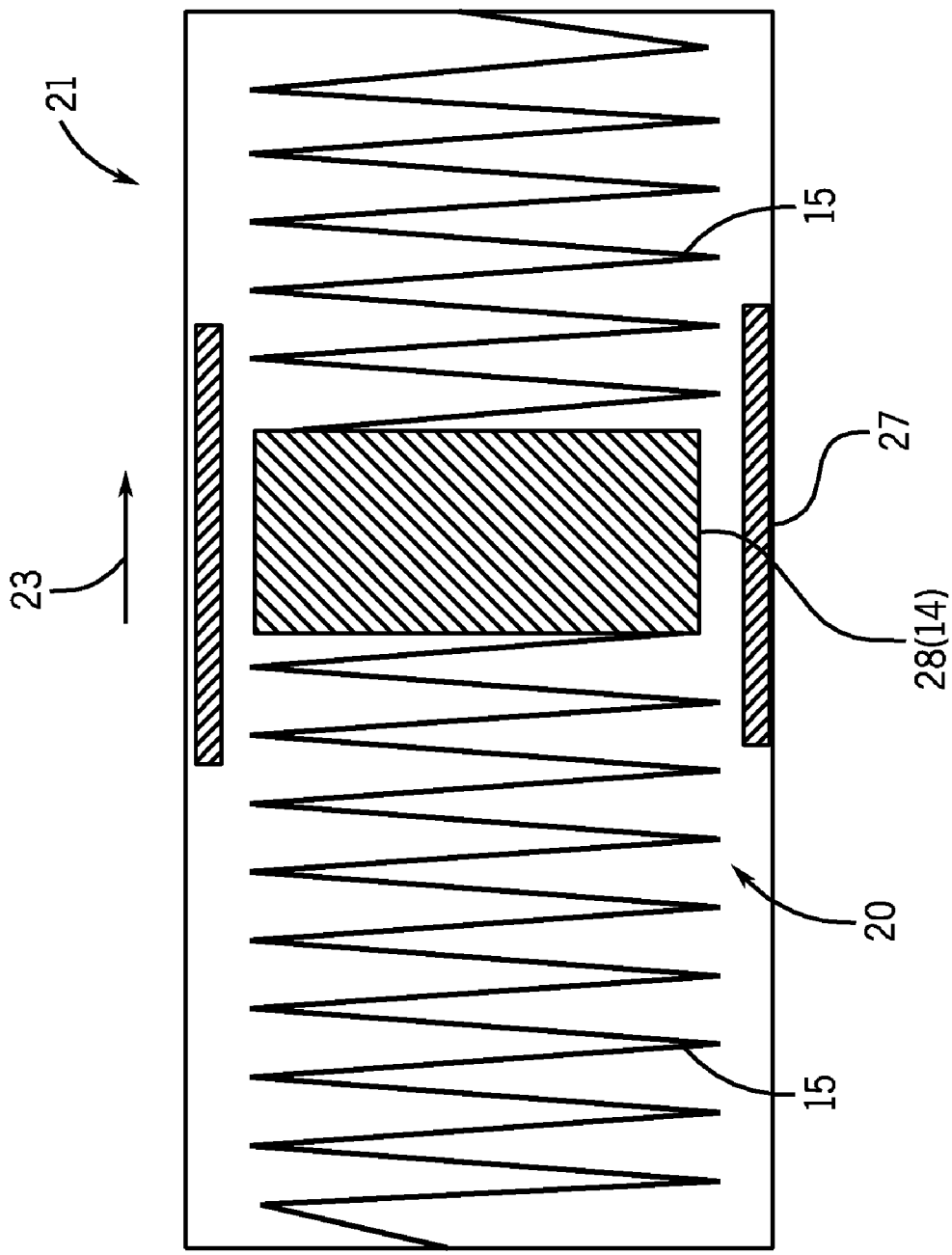
FIG. 4 illustrates a generator using a coil and magnet arrangement for use in the footwear of FIG. 1.
Figure 5:
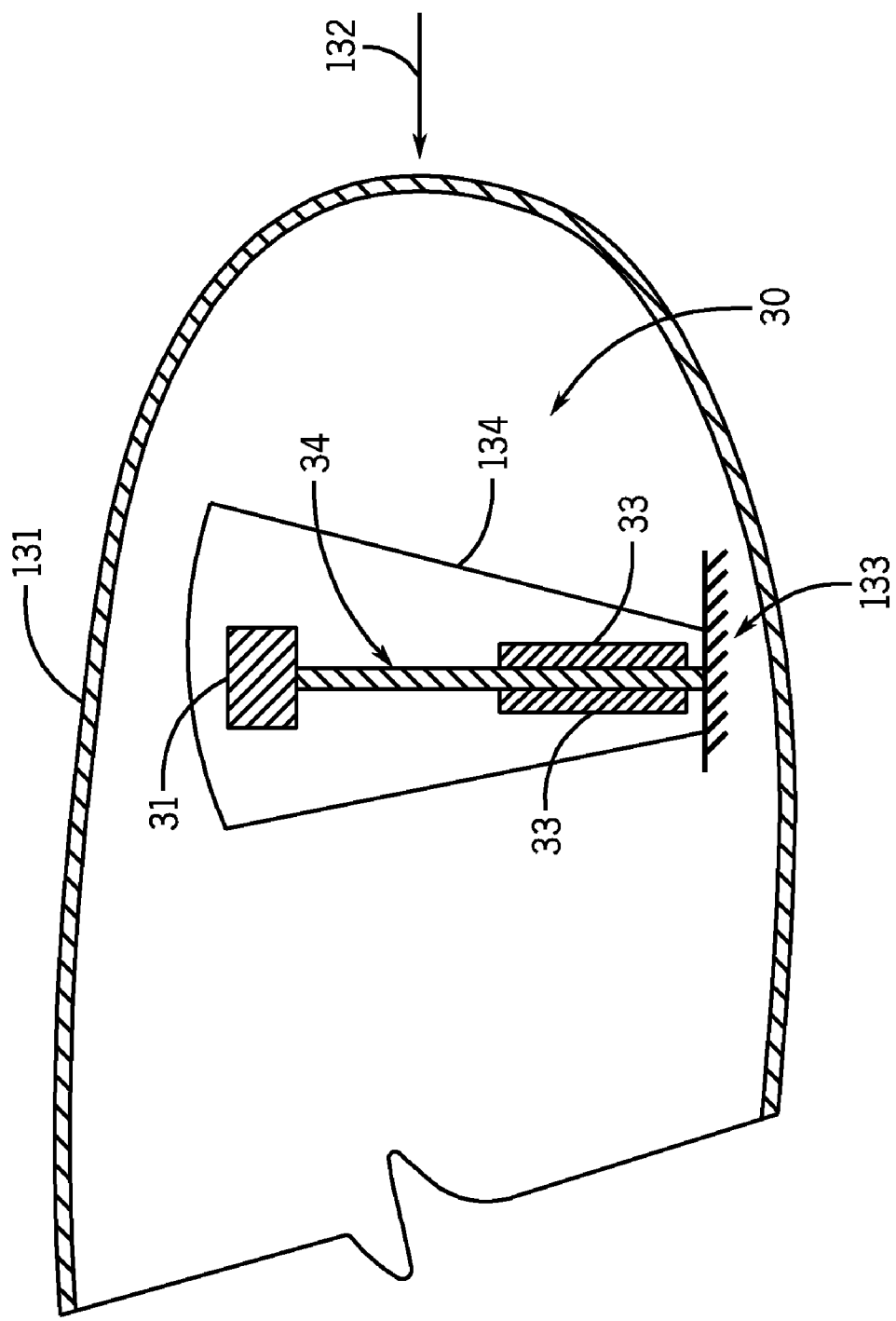
FIG. 5 illustrates another variation of a piezoelectric based generator for use in the footwear of FIG. 1.

It is noted that the vibration induced by the impact force in the direction of 105, FIG. 1, may be axial as shown for the generator elements shown in FIGS. 1, 2 and 4, or in bending, in torsion, or their combination. As an example, the impact in the direction 105, FIG. 1, can be used to induce bending deflection in the electrical energy generator 30 shown schematically in FIG. 5. The generator 30 consists of a cantilever beam 34 that is attached to the base structure of the footwear 131 at the location 133, similar to the generators 100 shown in FIG. 1, but as shown to be directed perpendicular to the direction of the impact 132, generated by the wearer kicking a relatively hard surface. Like the generators of FIG. 1, the generator 30 shown in FIG. 5 are disposed in a cavity 134 in the base structure. The generator 30 is preferably provided with at least one tip mounted mass 31 (the mass may be an integral part of the beam) to increase the amount of mechanical energy that could be stored in the generator 30 as a result of the aforementioned impact force in the direction of the arrow 132. At least one piezoelectric element 33 is attached to the surface of the beam, preferably close to its base so that it is subjected to high tensile strain (on one side of the beam) and compressive strain on the other side of the beam. Following an impact (kicking of the footwear to a relatively hard surface), the mechanical energy stored in the beam 34 and mass 31 assembly will cause the beam 34 to vibrate, thereby producing a varying charge in the piezoelectric elements 33 due to the aforementioned applied compressive and tensile strains. The generated electrical energy can then be directed to the heating pad(s) 104, FIG. 1, as previously described.

It is appreciated by those familiar with the art that the piezoelectric elements 24 and 33, FIGS. 2 and 5, respectively, can be pre-stressed in compression so that during the aforementioned vibration they are not subjected to tensile stress. This is the case since piezoelectric elements can be highly brittle and can withstand only small tensile strains.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A footwear comprising:
 a body;
 a base structure; and
 one or more electrical energy generators associated with one or more of the body and the base structure for generating electrical energy upon application of an impact to one or more of the body and the base structure;
 wherein at least one of the one or more electrical energy generators comprises a mass-spring unit having at least one spring and at least one mass capable of vibrating along a first axis substantially parallel to a sole of the base structure; and
 the one or more electrical energy generators are configured to generate electrical energy when the impact is substantially longitudinal to the first axis.

2. The footwear of claim 1, wherein the one or more electrical energy generators are disposed in the base structure and the base structure includes a cavity corresponding to each of the one or more electrical energy generators and each cavity holds a corresponding electrical energy generator therein.

3. The footwear of claim 1, wherein at least one of the one or more electrical energy generators further comprises:
   one or more piezoelectric materials connected to the at least one spring unit such that the at least one spring applies a force to the one or more piezoelectric materials to produce the electrical energy.

4. The footwear of claim 1, wherein the at least one mass is a rigid mass connected at one end to the at least one spring.

5. The footwear of claim 4, wherein the at least one spring comprises two springs and the one or more piezoelectric materials comprises two piezoelectric materials, wherein the mass is connected to one end of each of the two springs and the other end of the two springs is connected to a respective piezoelectric material.

6. The footwear of claim 1, wherein the at least one mass is a portion of the spring which is more densely wound than another portion of the spring.

7. The footwear of claim 1, wherein at least one of the one or more electrical energy generators comprises:
   a coil;
   a mass freely movable within the coil; and
   the at least one spring connects to the mass such that the mass vibrates within the coil upon application of the impact.

8. The footwear of claim 1, wherein at least one of the one or more electrical energy generators comprises:
   the at least one spring comprising a beam connected to the base structure at one end and having a mass positioned thereon; and
   one or more piezoelectric materials positioned on the beam such that the one or more piezoelectric materials are strained upon application of the impact and a resulting deflection of the beam.

9. The footwear of claim 1, further comprising a heating element positioned within the body and electrically connected to the one or more electrical energy generators for converting the electrical energy to heat.

10. A method for producing electrical energy within a footwear, the method comprising:
    impacting one or more of a body and a base structure of the footwear in a direction substantially parallel to a sole of the footwear; and
    vibrating a mass-spring unit in the base structure substantially along the direction to generate an electrical energy.

11. The method of claim 10, further comprising converting the electrical energy to heat energy.

12. The method of claim 11, further comprising applying the heat energy to at least a portion of a foot of a wearer of the footwear.

* * * * *